US007848975B2

(12) United States Patent
Bache

(10) Patent No.: US 7,848,975 B2
(45) Date of Patent: Dec. 7, 2010

(54) APPLICATION OF GENERAL INSTRUMENTS IN A CENTRAL SECURITIES DEPOSITORY (CSD)

(75) Inventor: Jens Bache, Gentofte (DK)

(73) Assignee: OMX Technology AB, Stockholm (SE)

( * ) Notice: Subject to any disclaimer, the term of this patent is extended or adjusted under 35 U.S.C. 154(b) by 1028 days.

(21) Appl. No.: 10/979,809

(22) Filed: Nov. 3, 2004

(65) Prior Publication Data
US 2005/0154661 A1 Jul. 14, 2005

Related U.S. Application Data

(63) Continuation-in-part of application No. 10/602,006, filed on Jun. 24, 2003, now abandoned.

(51) Int. Cl.
*G06Q 40/00* (2006.01)
(52) U.S. Cl. .............................. 705/35; 705/36; 705/37; 705/38; 705/39
(58) Field of Classification Search .................. 705/35, 705/36, 38, 39, 1, 16, 27, 30; 707/201
See application file for complete search history.

(56) References Cited

U.S. PATENT DOCUMENTS 5,497,317 A * 3/1996 Hawkins et al. .............. 705/37
5,802,499 A * 9/1998 Sampson et al. ............. 705/35
6,029,146 A * 2/2000 Hawkins et al. ............. 705/35
6,247,000 B1 * 6/2001 Hawkins et al. ............. 705/37
7,577,603 B2 * 8/2009 Leroy ........................... 705/35
7,624,052 B1 * 11/2009 Seaman et al. ............... 705/35
2003/0014343 A1 * 1/2003 Jones ........................... 705/36

OTHER PUBLICATIONS

PR Newswire, "BNY Clearing Services LLC, a Subsidiary of The Bank of New York, Launches Clearing and Settlement Services with the Korea Securities Depository", New York: May 1, 2002. p. 1-2.*
DTCC Tackles Global Corporate Actions, Chris Kentouris, Security Industry News, Apr. 28, 2003, 3-pages.*
"The Securities Settlement Industry in the EU Structure, Costs and the Way Forward"; Karel Lannoo & Mattias Levin, Centre for European Policy Studies, Dec. 2001, 50-pages.*

* cited by examiner

*Primary Examiner*—Alexander Kalinowski
*Assistant Examiner*—Gregory Johnson
(74) *Attorney, Agent, or Firm*—Nixon & Vanderhye P.C.

(57) ABSTRACT

A Central Securities Depository (CSD)-system carries out corporate actions in financial instruments. All financial instruments in the CSD-system are defined based on at least one of four functional basic building blocks: a first block for generating payments, a second block for requesting payments, a third block for adding holdings in an instrument, and a fourth block for removing holdings in an instrument.

19 Claims, 3 Drawing Sheets

Building blocks

Generate payments (interests, dividends, etc)

Request payment, (e.g. subscription) from investors

Add holdings to an account in the CSD-system (e.g. split or due to an acquisition)

Remove instruments from circulation in the CSD, e.g. from accounts. (due to e.g. maturity etc)

APPLICATION OF GENERAL INSTRUMENTS IN A CENTRAL SECURITIES DEPOSITORY (CSD)

This application is a continuation-in-part of application No. 10/602,006, filed Jun. 24, 2003, now abandoned.

TECHNICAL FIELD

The present application relates to a method for use in a so-called Central Securities Depository, commonly abbreviated as CSD, and to an improved CSD-system.

BACKGROUND

Traditionally, centralized financial infrastructure systems have been used mainly for storing gold or other assets, which belong to different nations in one and the same location. When transferring assets from one nation to another, all that needs to be done is to simply transfer assets from the account that belongs to the paying nation to the account which belongs to the nation that is to receive the payment.

As can be realized, the use of a centralized institution greatly facilitates the processing of payments, and for this reason, there has arisen an interest for using "CSD-like" systems for other commodities than gold, such as for example bonds and shares, and in principle for any kind of asset or instrument that can be imagined in the financial market, e.g. corporate bonds, warrants, etc.

Thus, in such an "expanded" centralized system, there would be a plethora of instruments advantageous to those using the system, e.g., issuers, brokers, banks, etc., as well as the operator of the system. Each instrument contained in such an expanded system is defined by a set of "events", i.e., actions that can occur or be carried out for that particular instrument. The system as such could be referred to as a Centralized Securities Depository, abbreviated as CSD. Examples of existing CSD-type systems are the Frankfurter Kassenverein, DTC (New York), Sicovam (Paris) and Euroclear (Brussels).

A particular set of events is typically defined for each type of instrument, each particular set being "tailor-made" for each type of instrument. A drawback with this is that with the large number of instrument types envisioned in future expanded CSDs, there will be a need to create an equally large number of such sets of events. This will be cumbersome to handle, in addition to which, in different countries and markets, even for one and the same kind of instrument type, slightly different events may be used.

Accordingly, for each new market where one and the same CSD system is used, even if the instruments contained in it are also the same, an extensive amount of adaptation or tailoring has to be made. Also, for each new type of instrument that is added to the CSD-system, a new set of events has to be tailor-made for that instrument type.

SUMMARY

There is a need to reduce the adaptations and tailoring of instruments when adding a new type of instrument to an existing CSD, or when adding an existing CSD-system to a new market. The amount of work necessary when making amendments to an existing instrument in an existing or new CSD should also be reduced. Much of the work necessary in the adaptations, tailoring and amendments is due corporate actions having a wide variety of shapes and types, depending on the security or instrument in question and the creativity of the issuer of that instrument.

The above mentioned problems are solved by a CSD-system that comprises four functional basic building blocks for defining instruments. The first block deals with generation of payments, especially payments to accounts in the CSD. Payments could for instance relate to payment of interest to holders of an instrument. The second block deals with request of payments, especially payments to be taken from accounts in the CSD. Such payments could for instance involve payments for investment in an instrument. The third block deals with adding holdings in an instrument, especially adding holdings in an instrument to an account in the CSD-system. The fourth block deals with removal of holdings in an instrument, especially removing holdings from an account in the CSD-system.

Using these four (functional) basic building blocks, any financial instrument that is to be implemented can be defined. This makes the CSD-system exceptionally adaptive. Any new instrument to be added to the CSD-system can be defined by one or more of the four basic blocks. Any other information required, e.g. specific amounts of money, percentages and dates for actions are can be dealt with in the same manner for all instruments (where applicable) and can be viewed as general parameters for the corporate actions carried out for the financial instruments.

An advantageous method of adding a financial instrument to a CSD-system is achieved by the method steps of identifying the corporate actions required for the new financial instrument, defining the corporate actions as a combination of one or more of above mentioned four functional basic building blocks, and implementing the defined combination in the CSD-system.

The CSD-system may also be used when carrying out a so called corporate action, also sometimes referred to as asset servicing, in a CSD-system on a security or an instrument. Non-limiting examples of corporate actions are payment of dividend or interest, splits or mergers. For example, the following steps may be implemented by the CSD-system:

1. retrieve information about the parameters for the corporate action,
2. using said parameters, express the corporate action with an appropriate combination of predefined operating components, the components being chosen from the following group:
   a. one component that generates payments to participants in the system
   b. one component that requests payment from participants in the system
   c. one component that adds holdings to an account in the CSD-system (e.g. split or due to an acquisition)
   d. one component that removes instruments from circulation in the CSD-system. (due to e.g. maturity etc)
3. execute the action according to the parameters and components that are included in the expressed action.

The parameters which are retrieved in the first step are suitable amounts, numerals and dates, the numerals referring to, for example, account numbers in the CSD-system and related bank accounts, as well as numerals used in codes which identify individual securities or instruments in the system. The dates which are retrieved can, for example, be dates on which the components in the expression are to be used, or a date when the entire expression is to be carried out.

DETAILED DESCRIPTION

Each instrument contained in a CSD-system can be defined by the events which can be carried out on the instrument in question, or carried out as a function of the instrument in question.

Figure 1:
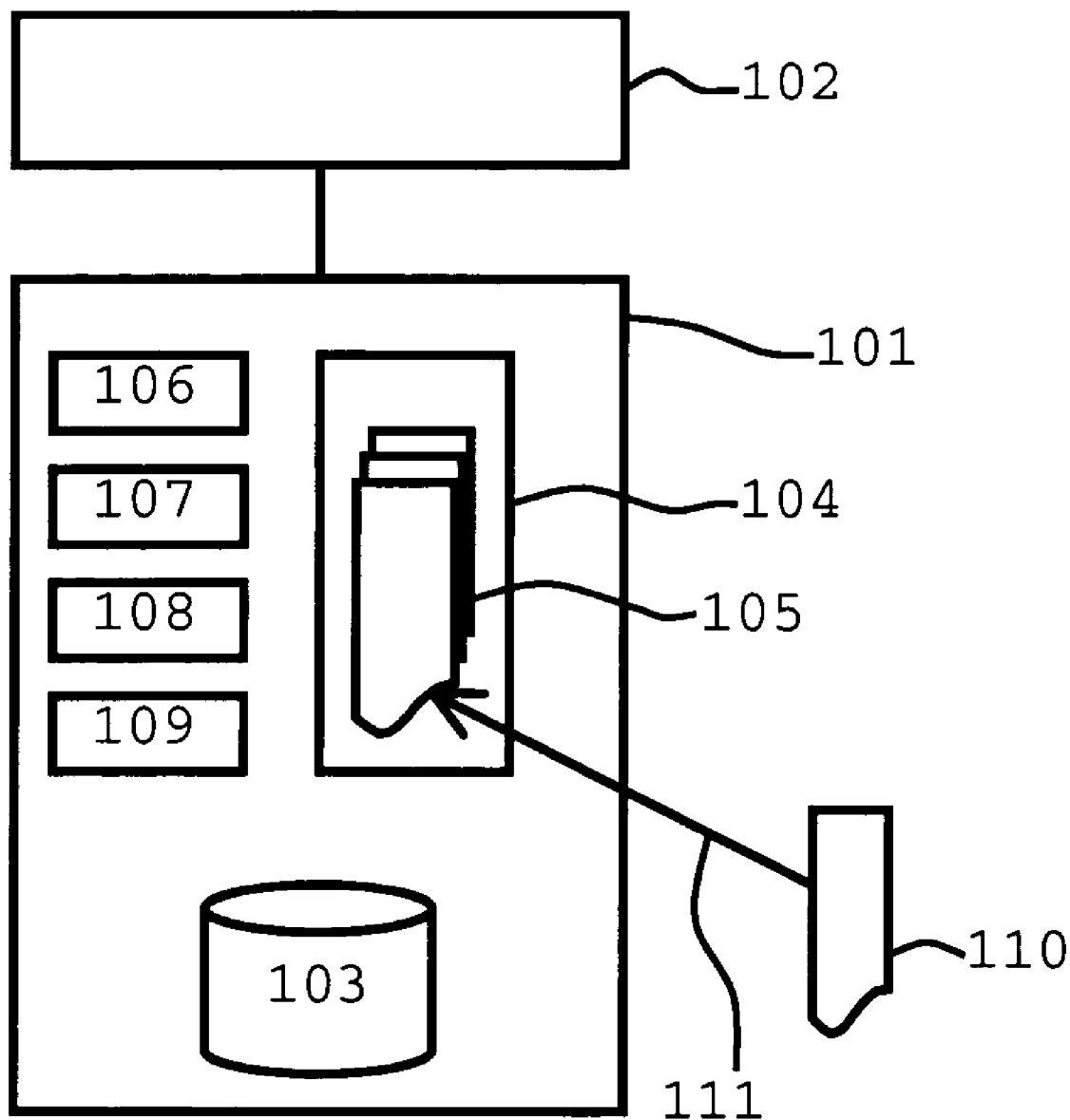
FIG. 1 shows a non-limiting example embodiment of a CSD according to the invention.

FIG. 1 shows a non-limiting example CSD-system 101 connected to external source 102. The external source 102 should here be viewed as an amalgamation of all possible external connections, i.e., to users, exchanges, external accounts, etc.

The CSD-system 101 of this non-limiting example comprises an accounts data base 103 where information related to accounts (money and/or holdings in financial instruments) is stored and a processing unit 104 performing necessary processing and clearing to carry out corporate actions for the financial instruments (indicated by reference numeral 105).

Each instrument 105 is defined by one or more basic building blocks (106, 107, 108, 109) representing basic operations or functions for the different financial instruments.

These blocks include: a first building block 106 representing payments, e.g. payments to be made to accounts in the data base 103 or accounts in an external bank (external source 102); a second building block 107 representing charges, i.e. payments to be taken from accounts in the data base 103 or an external bank (external source 102); a third building block 108 representing addition of holdings to accounts in the data base 103 or an external data base (external source 102); and a fourth building block 109 representing removal of holdings from accounts in the data base 103 or an external data base (external source 102).

When a new financial instrument 110 is to be added to the other instruments 105 in the CSD-system 101 (as indicated by line 111), the basic functions of the new instrument 110 are identified. Then these functions are expressed as a combination of one or more of the four building blocks 106, 107, 108, 109. Once this is done, the new financial instrument 110 can be implemented in the processing unit 104. Hereby, adding new financial instruments into the CSD-system 101 is greatly simplified. Also, when entering new markets, the use of combinations of the four building blocks 106, 107, 108, 109 facilitates this process greatly.

It could here be noted that the account data base 103 could be located outside the CSD-system 101. Also, regarding the data base 103, there could be one or more redundant data bases containing mirrored account data to increase safety for the account holders. Such redundant data bases could be located within or outside the CSD-system.

As mentioned earlier, the events that define an instrument can also be referred to as actions or "corporate actions", terms which will also be used from now on in this text. For the sake of clarity, a number of instruments and corporate actions that can be implemented in the CSD-system 101 will be described below.

Each corporate action comprises the following three steps:
1. Preparation of the corporate action
2. Execution of the corporate action
3. Settlement of the corporate action The first of the steps outlined above is the preparation of the corporate action. This step can be based on the contents of a database within the CSD and/or input from the issuer representative, "issuer representative" here being used as a generic term for the party in the CSD responsible for the instrument (e.g., a participant or the CSD operator)

A purpose of the first step is to set up the components and parameters that guide the second step, the execution. In other words, this step guides what is going to happen to the holdings of the instrument in question in the CSD.

The second step executes the corporate action. This step runs through a record such as, for example, the CSD database of securities holdings and looks at all accounts in the CSD that hold the instrument in question. Each holding is identified by a code—e.g., ISIN which is an ISO standard code meaning International Securities Identification Number.

For each account that holds the instrument in question, one or more "settlement obligations" are created, (e.g., payments to the holders of the securities in question), based on the parameters set up in step 1.

Finally, in this step, one or more balancing settlement obligations for the issuer of the instrument is created, as well as any mandatory reports, i.e. suitably a transaction list for, inter alia, the issuer.

The third step is the settlement. This step is not a focus of this description and can be carried out in a variety of manners well known to those skilled in the field.

In order to facilitate the understanding, a number of non-limiting examples will now be described, each example outlining a different instrument or action which can be included in a CSD-system, as well as the events which define that particular instrument or action.

Example 1

An Interest Payment

Consider a simple and commonly known example of a financial transaction for a financial instrument: interest payment for a bond issue. Assume that the parameters involved for the instrument in question are the following:

Interest: 5% per annum.

Smallest size: 100 USD

Total volume in circulation: 140.000.000 USD

Transaction date: Jun. 28, 2002

Due date: Jul. 1, 2002

The result of step 1, preparation, is: based on the holdings on June 28th, create a payment of 5 USD per one hundred, to be paid on July 1st from the issuer's cash record or holdings in the CSD.

Step 2, the execution of the event, would calculate the amount for each account in the CSD that exhibited the proper ISIN, and would then create a settlement obligation from the issuer to the account, for example to a bank account mentioned in the account.

In addition, in this step (step 2), the credit transactions will be netted per payment destination (e.g. bank), and the total amount will be checked against the total debit amount to the issuer and against the volume in circulation. In the present example, the total amount paid should be 7 million USD (5% of 140 million USD). This is reported to the issuer. Each bank (or other receiver of the payment) will receive a report containing the amount paid, and a transaction list containing the amount to be transferred to each investor's bank account.

Step 3 settles the settlement obligations on the due date after checking the cash on the issuer's cash record.

Example 2

A Maturity Payment

This example will deal with the same instrument as above, but now to be fully repaid on July 1st.

The result of step 1 is: based on the holding on June 28, create a payment of 100 USD per one hundred to be paid on July 1st versus delivery of the securities.

Step 2 calculates the amount for each account in the CSD-system, and creates a settlement obligation, i.e. an obligation to deliver the instruments to the issuer's account versus a payment from the issuer to the bank or banks mentioned in the accounts (as well as a transaction containing the payment to the bank account mentioned in the account).

The instruments are reserved on each account. Finally in this step, the credit payment transactions are netted per bank, and the total amount is checked against the total debit amount to issuer and against the volume in circulation.

In the present example the total amount paid should be 140 million USD (The full amount in circulation). This is reported to the issuer. The banks receive a report containing the amount paid, and a transaction list containing the amount to be transferred to each investor's bank account.

Step 3 settles the settlement obligations on the due date after checking the cash on the issuer's cash record.

Example 3

Composite Corporate Actions

A decision by a user can result in a number of corporate actions in the CSD-system. In this case, the term "corporate event" will be used, one corporate event including of one or more corporate actions.

As an example of such a composite action or corporate event, assume an issuer in the CSD-system, company A, decides to carry out a split in which investors would receive one new share for every old share. The new shares will receive only half a dividend the first year, after which point in time the two types of shares would be identical.

Step 1: based on the holding, add new shares (new ISIN to the holding).

Step 2: for every holding, create a settlement obligation (issue free of payment) in the new ISIN.

Step 3: settle the obligations that add the new shares to all holdings.

After the first year—on a date specified by the issuer:

New step 1: for every 'new share': issue 1 'old share' versus delivery of the 'new share'.

New step 2: for every holding of new shares, create delivery versus delivery settlement obligation.

New step 3: settle the dvd (delivery versus delivery) obligations that merge old and new shares into one holding per account.

Example 4

A corporate Action with Optional Elements

Some corporate actions involve an optional element for the investors using the CSD-system. One example of such an optional element would be that investors are given the possibility of choosing to receive bonus shares instead of being paid dividend.

Step 1, 2 and 3: For every holding of shares, add a right (a new ISIN since shares and rights are not identical) to the holding.

Give the investors a period to register their wishes on the rights. This can also be done through standing instructions, or by contacting the account controller.

Next step 1, 2 and 3: Generate payments or new shares based on the rights and the registered wishes.

A convertible bond is also an example of a security containing an element of choice. Another example of such an optional element is a takeover bid: for every XYZ-Data share it will be possible for participants to choose to receive 1 "ABC-software" share+1000 USD.

Example 5

Payment from the Investors

Company A decides to issue new capital through the existing shareholders. One new share will cost 107 USD.

Step 1, 2 and 3: For every holding of shares add a subscription right (new ISIN) to the holding. Give the investors a period to decide. They can sell the right or decide to accept the offer to buy new shares or they can simply ignore the offer.

New step 1, 2 and 3: For all investors that have accepted the offer: generate a delivery versus payment instruction to be settled via the clearing participant (in the CSD-system) chosen by the investor.

Examples 1-5 show different instruments which can be comprised in a CSD-system, and actions or composite actions ("events") which may be performed on these instruments, or triggered by the instruments. These actions and events can all be carried out in contemporary systems, but traditionally corporate actions have been developed one by one. This has created quite a plethora of solutions—with the accompanying maintenance problems, as well as problems of following the speed of the market regarding developments of new instruments or amendments to existing ones.

But given the technology described above, any corporate action, and thus also any corporate event (i.e. composite action), can be broken down into a combination of four components or building blocks. Thus, in a CSD-system, it is possible to define any corporate action by a combination of these four components or building blocks.

Figure 2:
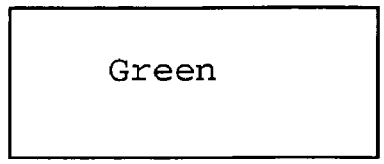
FIG. 2 shows building blocks according to a non-limiting example method.
Figure 2:
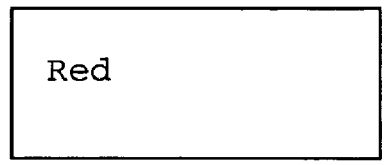
Figure 2:
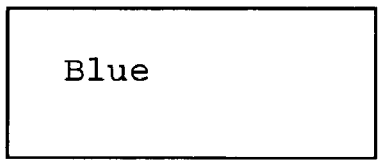
Figure 2:
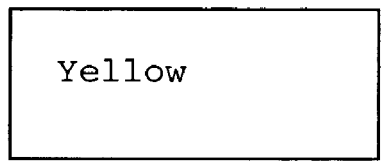

The four components are illustrated in FIG. 2:
1. "green" component—generate payments (interests, dividends, etc.)
2. "red" component"—request payment (e.g., subscription) from investors
3. "blue component"—add holdings to an account in the CSD-system (e.g., split or acquisition)
4. yellow" component—remove instruments from circulation in the CSD, e.g., from accounts, (due to e.g., maturity etc.).

As will be realized, the names given to these four components/building blocks are arbitrary. For example, the components might equally well be labeled "spinach", "carrot", "onion" and "cabbage", as the operator or designer of the CSD-system sees fit.

Before presenting a general formula, involving the use of the four building blocks of the invention, some examples will now be shown of how the building blocks can be applied to the five example corporate actions described previously.

As stated above, each corporate action can be said to comprise the following three steps:
1. Preparation of the corporate action
2. Execution of the corporate action
3. Settlement of the corporate action The second step, i.e. the execution, can be carried out using a combination of the building blocks. Using computer "pseudo-code" to express the second step, it is possible to express the second step of any corporate action in a manner similar to the following formula:

$$\text{For every x of the proper ISIN do } a*\text{green}+b*\text{red}+c*\text{blue}+d*\text{yellow} \quad (1)$$

The parameters x, a, b, c, d, and the appropriate dates, ISN's, and the account numbers in the CSD-system will have been set up in step 1. Step 1 can either be automated, i.e., carried out by an automatic process accompanying the CSD-system, or be set up manually by a user, e.g., the CSD staff or issuer representative. For example, step 1 may be automated for commonly occurring actions, and set up manually for actions which occur more rarely. Thus, the degree of automation in step 1 for a certain corporate action may depend on how common that action is.

The operations of non-limiting examples 1-5 above will now be shown with the use of the building blocks. The examples will be shown under the assumption that that step 1 ("setting up") has been automated and already has been carried out. The examples will be shown with pseudo-code.

Example 1'

An Interest Payment Action with "the Building Blocks"

The first of the examples above of corporate actions involved an interest payment:
For Every 100 of the Proper ISIN, do 5% Green It will be recalled that "green" was the building block used for generating payments within the CSD-system, and thus it will be appreciated how the use of that particular building block fits in this particular action.

Example 2'

A Maturity Payment Using "the Building Blocks"

The second of the examples given earlier dealt with the instrument from example 1 coming to maturity.
This can be expressed using the building blocks as:
For Every 100 of the Proper ISIN, do 100% Green+100% Yellow in the Proper ISIN The use of the green building block has been commented on previously, and will thus not be elaborated on further here. It will be recalled that the purpose or task of the yellow building block was to remove instruments from circulation in the CSD, e.g. from accounts, (due to e.g. maturity etc), which will explain the use of that building block in example 2'.

Obviously, adding a new instrument of this kind (example 1 and 2) to the CSD-system is greatly facilitated by the invention. All that is required is to use the basic blocks green and yellow to define the corporate actions required.

Example 3'

Composite Corporate Actions Using the Building Blocks

It will be recalled that the example was that Company A decides a split: where investors receive one new share for every old share. The new shares receive only half dividend the first year. After this point the two types of shares are identical.
For Every 1 of ISIN2, do 1 Blue in ISIN3

As described above, the blue building block is the block that adds holdings to an account.

When the dividend is to be paid during the first year (1,08 USD per year being half the dividend):
For every 1 of ISIN3, do 1,08 USD Green; since the green block is the one that generates payments.

The proper account numbers, ISIN identities etc are all obtained from step 1, i.e. the setting up, which is either automated or, if need be, done automatically by for example, the system operator.

After the first year:
For every 1 of ISIN3, do 1 blue in ISIN2+1 yellow in ISIN3,
i.e., the accounts receive shares that are identical to the original ones, and the "temporary" shares are nullified.

Example 4

Optional Elements

Example 4 above involved an optional element, i.e. investors were given the possibility of choosing to receive bonus shares instead of being paid dividends.
In pseudo-code
For every 1 of ISIN2, do 1 blue in ISIN3

The investors are then given a period to register their wishes regarding the rights ("ISIN3"). Following said period, payments or new shares based on the rights and the registered wishes are generated, expressed in the following manner.
New shares:
For every 1 of ISIN3, do 1 blue in ISIN4+1 yellow in ISIN3
Payments:
For every 1 of ISIN3, do 2,17 USD green+1 yellow in ISIN3
i.e. 2,17 USD per share against delivery of the "dividend coupon".

Example 5'

Example 5 above was that Company A decides to issue new capital through the existing shareholders. One new share will cost 107 USD.
For every 1 of ISIN2, do 1 Blue in ISIN3

Thus, for every holding of shares add a subscription right (new ISIN) to the holding, then give the investors a period to decide. They can sell the right, decide to accept the offer to buy new shares, or they can simply ignore the offer.
Accept the offer:
For every 1 of ISIN3, do 1 blue in ISIN4+107 USD red+1 yellow in ISIN3
Ignore the offer:
For every 1 of ISIN3, do 1 yellow in ISIN3
Sell the rights:
Could be handled outside of the present CSD-system, as an ordinary trade in which 100 rights are sold at a price agreed upon.

Thus, all so called corporate events (using the earlier given definition of that term) that can occur in an expanded CSD-type system can be defined in an extremely simple manner, as opposed to traditional methods for doing the same.

Figure 3:
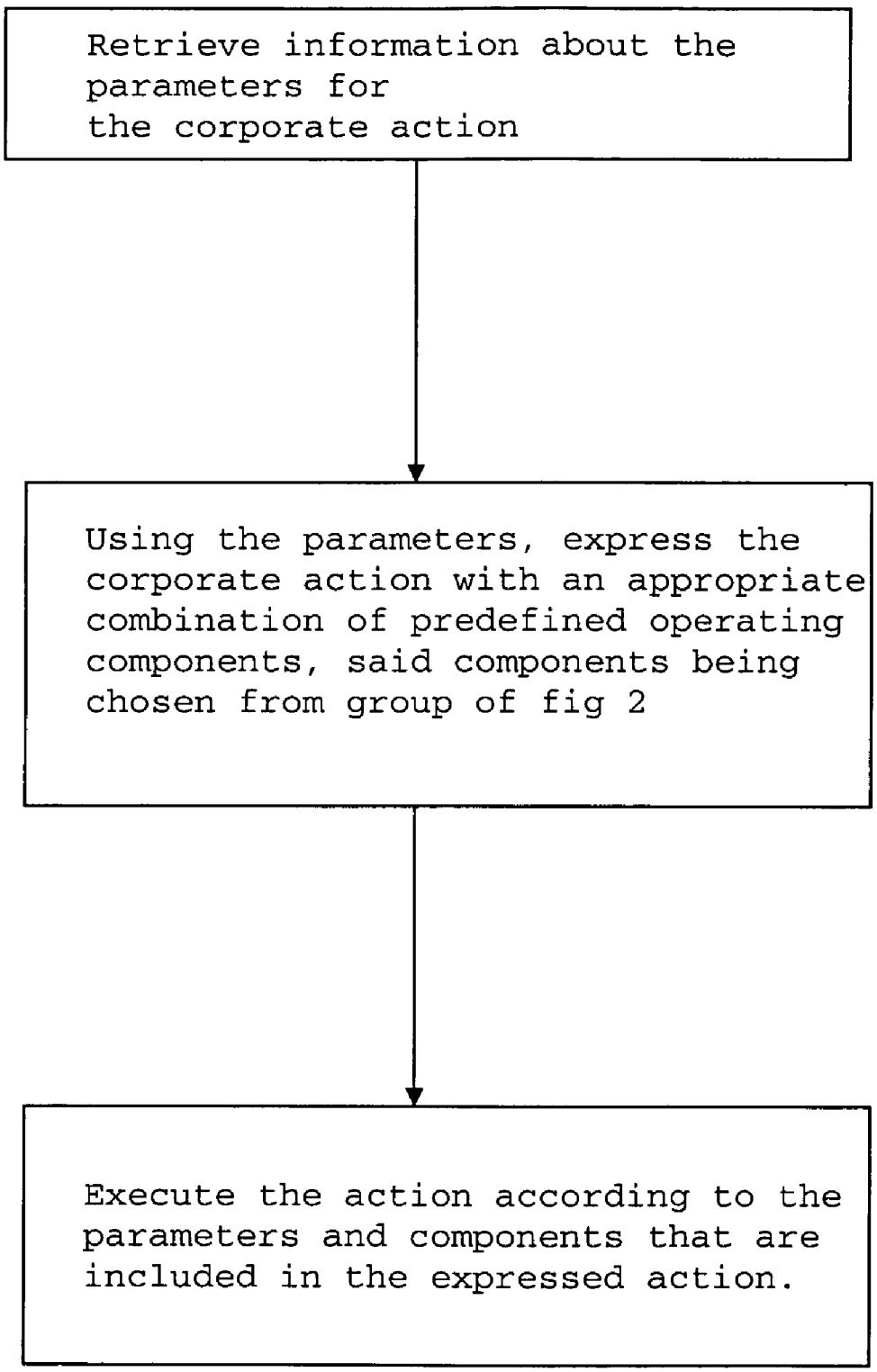
FIG. 3 shows a schematic flowchart of a non-limiting example method.

An "arbitrary" type of corporate action in a CSD-type system is now described in conjunction with the flowchart in FIG. 3:

1. retrieve information about the parameters for the corporate action,
2. using said parameters, express the corporate action with an appropriate combination of predefined operating components, said components being chosen from the following group:
   a. one component that generates payments to participants in the system
   b. one component that requests payment from participants in the system
   c. one component that adds holdings to an account in the CSD-system (e.g., split or due to an acquisition)
   d. one component that removes instruments from circulation in the CSD-system (due to e.g. maturity etc.).
3. execute the action according to the parameters and components that are included in the expressed action.

The parameters which are retrieved in the first step are suitable amounts, numerals and dates; the numerals referring to, for example, account numbers in the CSD-system and related bank accounts, as well as numerals used in codes which identify individual securities or instruments in the system. The dates which are retrieved can, for example, be dates on which the components in the expression are to be used, or a date when the entire expression is to be carried out. The amounts retrieved can suitably refer to the securities or instruments used.

It should be pointed out that the first of the steps outlined above, i.e. the retrieval of parameters, has been added in order to facilitate understanding and is optional.

I claim:

1. A central securities depository (CSD) system for storing financial instruments for their respective owners and for carrying out one or more corporate actions in financial instruments, comprising:
   functional basic building blocks for carrying out corporate actions in financial instruments in the CSD-system, where a corporate action is an event that affects a financial instrument without necessarily involving a change of ownership of that financial instrument, the functional basic building blocks including:
   a first block for generating payments,
   a second block for requesting payments,
   a third block for adding holdings in an instrument, and
   a fourth block for removing holdings in an instrument,
   wherein each financial instrument in the CSD-system is defined by one or more of the functional basic building blocks, and
   a processor that carries out any of the corporate actions using one or more of the functional basic building blocks and carries out at least one or more corporate actions by combining multiple ones of the functional basic building blocks.

2. The CSD-system according to claim 1, wherein new financial instruments can be added to the CSD-system by defining the new financial instrument using one or more of said four basic building blocks.

3. A method for adding a financial instrument to a central securities depository (CSD) system, comprising:
   storing, in the CSD system, financial instruments for their respective owners,
   identifying, by a processor, one or more corporate actions required for the added financial instrument, where a corporate action is an event that affects a financial instrument without necessarily involving a change of ownership of that financial instrument,
   generating, by the processor, any of the corporate actions using one or more of four functional basic building blocks,
   carrying out, by the processor, at least one or more of the corporate actions as a combination of two or more of four functional basic blocks, where each financial instrument in the CSD-system is defined by one or more of the functional basic blocks, said four basic blocks including a first block for generating payments, a second block for requesting payments, a third block for adding holdings, and a fourth block for removing holdings, and
   implementing, by the processor, said defined combination in said CSD-system to carry out said one or more corporate actions.

4. A method for use in a central securities depository (CSD) system that stores financial instruments for their respective owners when carrying out a corporate action in the CSD-system on a financial instrument, where a corporate action is an event that affects a financial instrument without necessarily involving a change of ownership of that financial instrument, the method comprising:
   retrieving, by a processor, information about the parameters for the corporate action,
   using said parameters, the processor expressing the corporate action with a combination of predefined operating components, where each financial instrument in the CSD-system is defined by one or more of the predefined operating components, said components being chosen from the following group:
   a component that generates payments to participants in the system,
   a component that requests payment from participants in the system,
   a component that adds holdings to an account in the CSD-system,
   a component that removes instruments from circulation in the CSD-system, and
   executing, by the processor, the corporate action according to the parameters and components that are included in the expressed corporate action.

5. The method of claim 4, wherein one of the parameters retrieved is an amount which refers to a financial instrument used in the expression for the corporate action.

6. The method of claim 4, wherein one of the parameters retrieved is a numeral which refers to an account number in the CSD-system, a bank account, or a code which identifies an individual financial instrument in the CSD-system.

7. The method of claim 4, wherein one of the parameters retrieved is a date on which the components in the expression for the corporate action are to be used, or when the expression for the corporate action is to be carried out.

8. A computerized central securities depository (CSD)-system for storing financial instruments for their respective owners and for carrying out corporate actions on financial instruments, comprising:
   means for retrieving information about the parameters for a corporate action, where a corporate action is an event that affects a financial instrument without necessarily involving a change of ownership of that financial instrument,
   means for using said parameters to express the corporate action with a combination of predefined operating components, where each financial instrument in the CSD-system is defined by one or more of the predefined operating components,
   means for choosing said predefined operating components from the following:

a component that generates payments to participants in the system, a component that requests payment from participants in the system, a component that adds holdings to an account in the CSD-system, a component that removes instruments from circulation in the CSD-system, and means for executing the corporate action according to the parameters and predefined operating components that are included in the expressed corporate action.

9. The system of claim 8, wherein one of the parameters which are retrieved is an amount which refers to a financial instrument used in the expression for the corporate action.

10. The system of claim 8, wherein one of the parameters retrieved is a numeral which refers to an account number in the CSD-system, a bank account, or a code which identifies an individual financial instrument in the CSD-system.

11. The system of claim 8, wherein one of the parameters retrieved is a date on which the components in the expression for the corporate action are to be used, or when the expression for the corporate action is to be carried out.

12. The CSD-system in claim 1, wherein the corporate action on the security includes one of the following: an interest payment, a dividend payment or distribution, a maturity payment, a split in shares, and issuing a right of new shares.

13. The method in claim 3, wherein the corporate action on the security includes one of the following: an interest payment, a dividend payment or distribution, a maturity payment, a split in shares, and issuing a right of new shares.

14. The method in claim 4, wherein the corporate action on the security includes one of the following: an interest payment, a dividend payment or distribution, a maturity payment, a split in shares, and issuing a right of new shares.

15. The method in claim 8, wherein the corporate action on the security includes one of the following: an interest payment, a dividend payment or distribution, a maturity payment, a split in shares, and issuing a right of new shares.

16. The CSD in claim 1, wherein the processor is configured to carry out multiple corporate actions by combining multiple ones of the functional basic building blocks.

17. The CSD in claim 8, wherein the means for executing processor is configured to carry out multiple corporate actions by combining multiple ones of the predefined operating components.

18. The method of claim 4, wherein the processor performs any of the corporate actions in the CSD using one or more of the components.

19. The system of claim 8, wherein the means for executing is configured to perform any of the corporate actions in the CSD using one or more of the components.

* * * * *